Oct. 11, 1932.  L. H. MORSE ET AL  1,881,846

GAS VALVE

Filed May 8, 1931

Inventors:
Lynn H. Morse
Lewis A. Lockhart
by Emery, Booth, Varney & Townsend
Attys Patented Oct. 11, 1932

1,881,846

UNITED STATES PATENT OFFICE

LYNN H. MORSE AND LEWIS A. LOCKHART, OF NATICK, MASSACHUSETTS, ASSIGNORS TO ERNEST L. CHASE, TRUSTEE, OF DORCHESTER, MASSACHUSETTS

GAS VALVE

Application filed May 8, 1931. Serial No. 535,873.

This invention relates to valves which are adapted to be released under abnormal conditions of heat, such, for example, as occur when a building is on fire, to cut off a flow of fluid, commonly illuminating gas. Our invention may be considered as an improvement on the valve shown in the patent to Humphries 114,144, April 25, 1871. The object of our invention is to provide a simple and secure method of supporting the valve proper having various advantages in manufacture and use which will appear as the description proceeds.

Our invention will be well understood by reference to the following description taken in connection with the accompanying drawing showing by way of example preferred illustrative embodiments of the invention and in which:—

Figure 1:
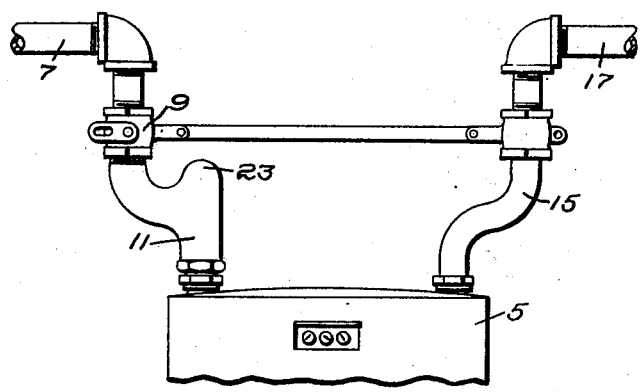
Fig. 1 is a fragmentary elevation of a gas meter installation embodying a valve such as is the subject matter of the invention as a part thereof.

Referring to Fig. 1 of the drawing, we have there shown a gas meter 5 to which illuminating gas flows from the supply main 7 through shut-off valve 9 and a connection which may comprise the casing 11 of a valve constructed in accordance with the invention, the gas leaving the meter through the offset 15 leading to the supply line 17. Herein the casing 11 is of an offset form corresponding generally to the form of the pipe 15 and in existing installations of a well known type which utilize two such offset connections to facilitate the fitting of the meter to the piping the valve may be substituted directly for such a pipe.

Figure 2:
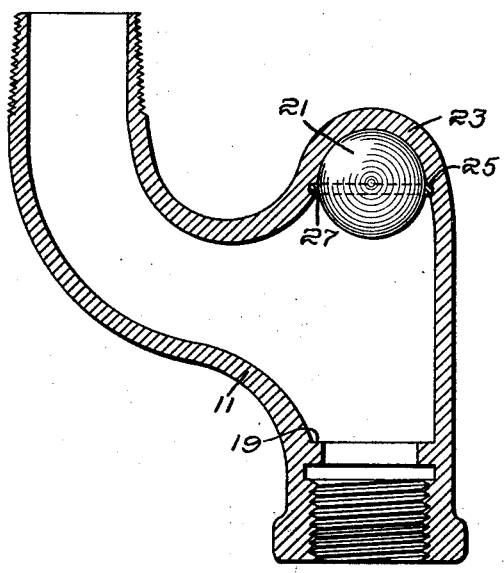
Fig. 2 is a vertical section on a larger scale of one form of valve.

Referring now to Fig. 2, the lower portion of the fitting may be provided with a valve seat 19 adapted to be closed by the valve proper 21 which preferably takes the form of a steel ball 21. This ball 21 is normally supported laterally of the gas passage through the fitting and when released when subjected to abnormal heat conditions falls under gravity to the seat 19. Preferably this may be a straight drop and herein due to the offset in the gas passage this is conveniently attained and we have herein shown the ball as housed in an enlargement 23 of the casing vertically above the seat 19, this enlargement herein shown as taking the form of a closed hood receiving the ball in its interior with a slight clearance.

The inner wall of the offset 23 is recessed, preferably by an annular groove 25, at a location in a plane below the center of the ball in its normal position shown in Fig. 2, this groove forming an upwardly facing shoulder of a diameter greater than the ball so that it may fall freely past the same when released. A body of fusible metal 27 peripherally supported on this shoulder engages the convexity of the ball below its center and gives a direct underriding support thereto. The ball may be dropped into the fitting from the upper end of Fig. 2 and the fitting then turned upside down to permit the ball to roll into the offset. Molten metal may then be poured in about the exposed convexity of the ball into the space between the same and the wall of the offset, which metal flows into the groove 21 and sets in position to form a retaining ring supported on the shoulder of groove 25 and on which the ball rests as shown in Fig. 2.

The process of manufacture is simple. The ball is firmly supported by mechanical means from the wall of the casing 11 of the fitting. No reliance need be placed upon the adhesive properties of the fusible metal. When cast in as described, the ball is closely held against the top of the chamber which receives it without opportunity for play. The security of its support has been shown experimentally in a structure similar to that shown in Fig. 2 by drilling a hole through the top of the chamber which receives the ball and inserting a pin into contact with the ball. A number of blows with a heavy hammer were required before the ball was dislodged. Obviously the construction is immune to displacement during handling or under the shocks and vibrations to which it may be subjected after installation.

Figure 3:
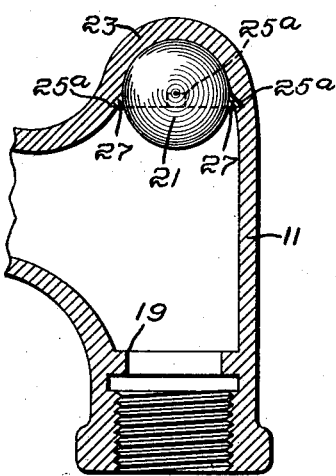
Fig. 3 is a similar section of a modification.

In the modification shown in Fig. 3, the inner wall of the offset chamber 23 is provided with recesses 25a at intervals thereabout instead of the continuous annular groove 25 of Fig. 2. Fusible metal 27 poured in as before at the locations of these recesses may form a more or less continuous ring about the ball and at intervals keys resting on the shoulders formed by the recesses. In this construction the convex surface of the ball fits against the inner ends of the keys which are obliquely presented. The keys form struts and the weight of the ball presses them outwardly into the recesses 25a in the manner of a keystone, the shoulders of the recesses corresponding to the piers of an arch and the wall of casing 11 to the abutments. It will be understood that a similar action takes place in the modification of Fig. 2.

We are aware that the invention may be embodied in other specific forms without departing from the spirit or essential attributes thereof, and we therefore desire the present embodiment to be considered in all respects as illustrative and not restrictive; reference being had to the appended claims rather than to the foregoing description to indicate the scope of the invention.

We claim:

1. In a valve of the type wherein a ball valve is supported by fusible material laterally of a fluid passage for release under excessive heat to a cooperating seat in the passage, a part receiving the ball having an annular groove in its inner wall opposing the ball below its center and a ring of fusible metal cast about the convexity of the ball and into said groove.

2. In a valve of the type wherein a ball valve is supported by fusible material laterally of a fluid passage for release under excessive heat to a cooperating seat in the passage, a part receiving the ball having its inner wall recessed in a plane below the center of the ball and fusible metal cast about the convexity of the ball and into interlocking engagement with said recessed wall.

3. In a valve of the type wherein a ball valve is supported by fusible material laterally of a fluid passage for release under excessive heat to a cooperating seat in the passage, a part receiving the ball having an upwardly facing annular shoulder of greater diameter than the ball and in a plane below the center thereof and a circular body of fusible metal having its peripheral portion seated on said shoulder and its inner portion extending inward past the diameter of the ball and providing an underriding support therefor.

4. In a valve of the type wherein a valve is supported by a fusible material laterally of a fluid passage for release under excessive heat to a cooperating seat in the passage, a part receiving the valve having a recessed inner wall and fusible metal cast into interlocking engagement with the recessed portion of the wall and projecting to provide an underriding support for the valve.

5. In a valve of the type wherein a ball valve is supported by fusible material laterally of a fluid passage for release under excessive heat to a cooperating seat in the passage, a part receiving the ball shouldered to provide supporting surfaces below the center of the ball and fusible metal supporting means resting on said surfaces and having faces presented obliquely to the convexity of the lower part of the ball whereby the ball thrusts against said means toward said surfaces.

6. In a valve of the type wherein a ball valve is supported by fusible material laterally of a fluid passage for release under excessive heat to a cooperating seat in the passage, a part receiving the ball having upwardly facing shoulders below the center of the ball, struts set on said shoulders having obliquely directed ends presented to the convexity of the lower part of the ball, which acts on them in the manner of a keystone to press said struts against said shoulders as piers and against the walls of said part as abutments, said struts embodying fusible metal whereby they collapse under excessive heat.

In testimony whereof, we have signed our names to this specification.

LYNN H. MORSE.
LEWIS A. LOCKHART.